United States Patent
Donaldson

[15] 3,687,315
[45] Aug. 29, 1972

[54] REACTOR DEVICES FOR WHEELED VEHICLES

[72] Inventor: John Taylor Donaldson, London, England

[73] Assignee: The Secretary of State for Denfense in Her Britannic Majesty's Government of the United Kingdom of Great Britain and Northern Ireland, London, England

[22] Filed: July 22, 1970

[21] Appl. No.: 57,195

[30] Foreign Application Priority Data

July 22, 1969 Great Britain..........36,709/69

[52] U.S. Cl..................214/86 A, 280/402, 280/407
[51] Int. Cl. ..............................................B60p 3/12
[58] Field of Search.....214/86 A; 280/405, 406, 480, 280/497, 474, 407

[56] References Cited

UNITED STATES PATENTS

| | | | |
|---|---|---|---|
| 1,481,376 | 1/1924 | Klein | 280/480 X |
| 3,271,049 | 9/1966 | Schoonmaker et al | 280/480 X |
| 3,322,396 | 5/1967 | Hubbard | 214/86 A X |
| 2,782,944 | 2/1957 | Macklin | 214/86 A |
| 2,756,072 | 7/1956 | Koontz | 280/405 |
| 2,160,350 | 5/1939 | Bechman | 280/497 |
| 2,815,223 | 12/1957 | Wharton | 280/406 |
| 3,284,097 | 11/1966 | Koontz | 280/405 |

*Primary Examiner*—Albert J. Makay
*Attorney*—Cameron, Kerkam & Sutton

[57] ABSTRACT

A reactor device for attachment to a wheeled towing vehicle having a crane from which an adjacent end of a casualty vehicle may be suspended incorporates a compression member attached to the towing vehicle and adapted for attachment to the adjacent end of the casualty vehicle; a tension device attached, below the compression member, to the towing vehicle and adapted for attachment to the casualty vehicle whereby a tensile force produced in the tension device will induce in the compression member a compressive force which, with said tensile force, constitutes a couple tending to increase the contact forces between the ground and front wheels of the towing vehicle.

8 Claims, 6 Drawing Figures

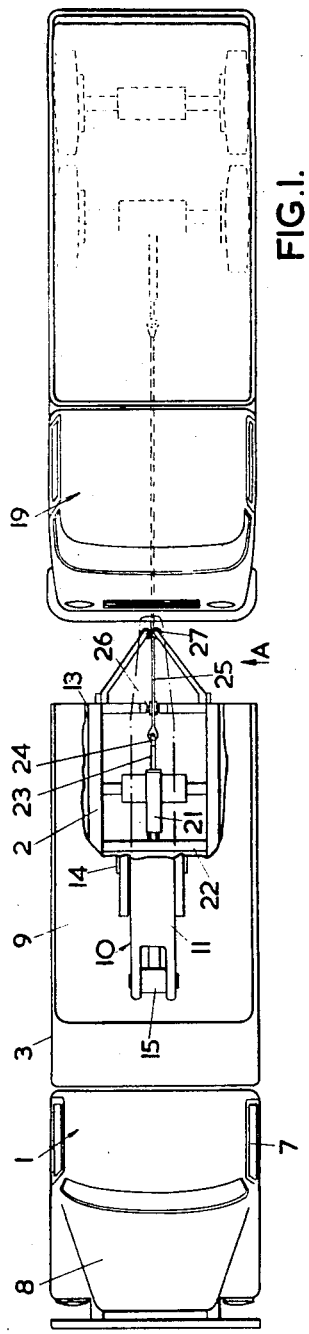
FIG.I.
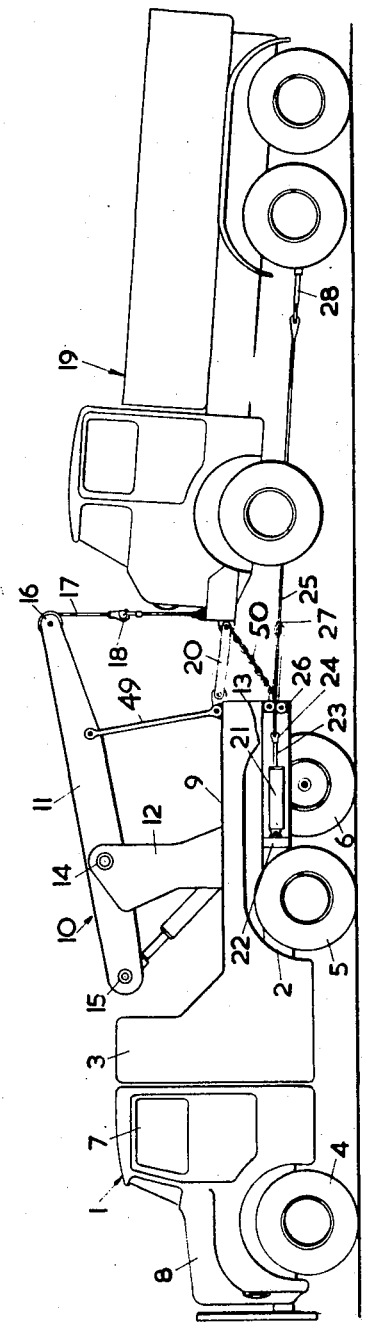
FIG.2.

REACTOR DEVICES FOR WHEELED VEHICLES

This invention relates to reactor devices for wheeled vehicles and more specifically to the application of such a device to a vehicle adapted for towing another vehicle, for example to a vehicle recovery tractor.

When one wheeled vehicle tows another wheeled vehicle the interaction between the vehicles through the coupling means causes changes in the contact forces between the vehicles' wheels and the ground.

For instance, in the case of a vehicle recovery tractor towing a casualty vehicle by suspension, or partial suspension, of the towed vehicle from a jib at the rear of tractor, off-loading of the front axle of the tractor can occur. This off-loading is caused by the moment about the rear suspension system of the tractor due to the combined effects of the hook load imposed on the jib by the casualty vehicle, together with the towing force exerted by the tractor upon the casualty and the torque reaction generated by the tractor transmission.

Front axle off-loading induced in this way introduces certain adverse features and limitations in the handling and performance of the tractor. The cornering power of the front tires and hence the response to steering control is diminished. This is particularly so when climbing a gradient when it is possible for the front wheels to leave the ground completely with a subsequent drop in forward traction in addition to loss of directional control.

In order to reduce these limitations, vehicles have been designed with an increased front axle weight, the longest practicable wheelbase and with the recovery crane hook overhang from the rear suspension of the tractor kept to a minimum. However, the incorporation of these features can lead to an uneconomical and costly design in an attempt to provide an acceptable tow performance.

The present invention is directed towards providing a means of countering the front axle off-loading which occurs on a recovery tractor when carrying out part suspended towing of another vehicle so reducing the adverse effects and limitations on the handling and performance of the tractor. In accordance with the present invention a reactor device for wheeled vehicles comprises a supporting member attached to a vehicle for towing and from which an adjacent end of another vehicle may be suspended; a compression device attached to the vehicle for towing and adapted for attachment to said adjacent end of the other vehicle; a tension device attached, below the compression device, to the vehicle for towing and adapted for attachment to the other vehicle whereby a tensile force produced in the tension device will induce in the compression device a compressive force and likewise a compressive force produced in the compression device will induce in the tension device a tensile force, said tensile and compressive forces together constituting a couple tending to increase the contact forces between the ground and those supporting wheels of the vehicle for towing which are remote from the other vehicle.

According to a preferred feature of the present invention said tension device includes jacking means for changing its effective length.

In an alternative feature of the present invention said compression device includes jacking means for changing its effective length.

Embodiments of the invention will now be described by way of example with reference to the accompanying drawings of which:

FIG. 1 is a part sectional plan view of a vehicle recovery tractor coupled to a casualty vehicle.

FIG. 2 is a side elevation of the vehicles as shown in FIG. 1 looking in the direction of arrow A therein with the rearmost nearside wheel removed from the vehicle recovery tractor to show part of the mechanism.

Figure 3:
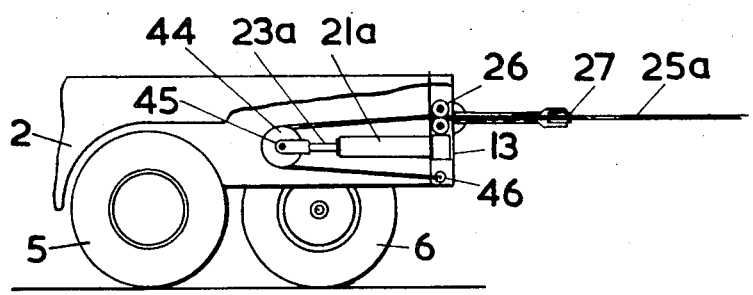
FIG. 3 is a part view, similar to FIG. 2, showing an alternative mechanism.

A vehicle recovery tractor 1 shown in FIGS. 1 and 2 has a chassis 2 adapted to support a body 3 on three pairs of road wheels 4, 5 and 6. The body 3 is of the truck type, having a forward driving cab 7 in front of which is mounted the main propulsion engine 8. Behind the driving cab 7 the chassis 2 supports a substantially horizontal plateform 9 carrying a crane 10 which constitutes the supporting member. The crane 10 has a jib 11 pivotably mounted on a pillar 12. The pillar 12 is positively attached to the horizontal platform 9 so that the jib 11 overhangs the rear end 13 of the recovery tractor 1; the pillar 12 carrying a transverse fulcrum 14 about which the jib 11 is rotatable. Jacking means, not fully shown, is attached to the inboard end 15 of the jib 11 thereby controlling the angle of tilt of the jib 11 with respect to the horizontal platform 9. The jacking means can be, for instance, either a hydraulic ram or a mechanical screw jack device operated manually or by an electric servo motor. The outboard end 16 of the jib 11 carries a pulley wheel, to guide a suspension cable 17, which passes over the pulley wheel and carries a hook 18 for suspending a casualty vehicle 19. The inboard end of the cable 17 is connected in a known manner to a suitable winding gear, such as a drum mounted to rotate at the base of the pillar 12. Manual and servo powered means of drum rotation are incorporated together with a drum locking device to prevent, when correctly positioned, any further extension or retraction of the hook 18 relative to the outboard end 16 of the jib 11. Two struts 49, each attached by one end to the rear of the horizontal platform 9, are adapted to be removably attached by the other ends to the outboard end 16 of the jib 11. By this means the jib may be positively located when it is not required to raise or lower the outboard end 16, for instance, when the casualty vehicle 19 has been raised into the required position prior to being towed.

At the mid portion of the rear end 13 of the tractor a compression member 20 is mounted by one end to pivot in a vertical plane through the center line of the vehicle recovery tractor 1. The free end of the compression member 20 is adapted to be removably coupled to a suitable member on the casualty vehicle 19, for example by a yoke, eye and pin arrangement.

Beneath the horizontal plateform 9, mounted in the longitudinal central vertical plane of the vehicle recovery tractor, is a hydraulic ram 21 hinged at one end to a chassis frame cross member 22, the other end extending towards the rear end 13 of the vehicle recovery tractor 1 where the piston rod 23 terminates in a yoke 24. Attached to the yoke 24 is a wire rope assembly 25 which passes rearwards between a pair of guide pulleys on horizontal axes 26 and then through a fairlead 27 consisting of two pulleys on vertical axes, mounted on a triangular frame which is hinged to a pair of attachment eyes on the rear end 13 of the vehicle recovery tractor 1. In order to provide a correct hinging action between the vehicle recovery tractor and the suspended casualty vehicle 19 when the longitudinal central vertical planes of the two vehicles are at an angle to each other, for instance when a curve is being negotiated, the pulleys on fairlead 27 are located vertically below the free end attachment point of the compression member 20. The end of the wire rope assembly 25 extending from the fairlead 27 consists of an adjustable chain link assembly 28 which can be attached to a rearward point of the casualty vehicle 19. A convenient attachment point on the casualty vehicle 19 is the rear axle assembly.

During use, when the casualty vehicle 19 is supported from the jib 11 by cable 17 at the rear of the vehicle recovery tractor 1, the moment produced about the rear suspension due to the weight of the casualty vehicle tends to lift the front wheels 4 of the vehicle recovery tractor 1. This tendency of the front wheels 4 to lift is offset by attaching the compression member 20 and the adjustable chain link assembly 28 to the front and rear respectively of the casualty vehicle and then applying a tension in the wire rope assembly 25 by actuating the hydraulic ram 21. A compressive force is thereby induced in the compression member 20 and the reactions at the attachment points of the hydraulic ram 21 and the compressive member 20, on the rear end 13 and the chassis frame cross member 22, respectively, constitute a couple acting in opposition to the moment produced by loading the jib 11. This couple tends to increase the contact forces between the front wheels 4 and the ground.

An additional feature which may be included, particularly when the vehicles are to traverse uneven terrain, is a chain 50, which may be attached to a suitable mounting on one of the horizontal axes 26 at the rear of the vehicle recovery tractor 1 and to the front of the casualty vehicle 19 adjacent to the attachment point of the compression member 20. When the chain is coupled between the vehicles in this way it checks any tendency of the vehicles to "jack-knife" in the vertical plane when the casualty vehicle 19 might tend to ride over the rear end 13 of the vehicle recovering tractor 1.

Figure 4:
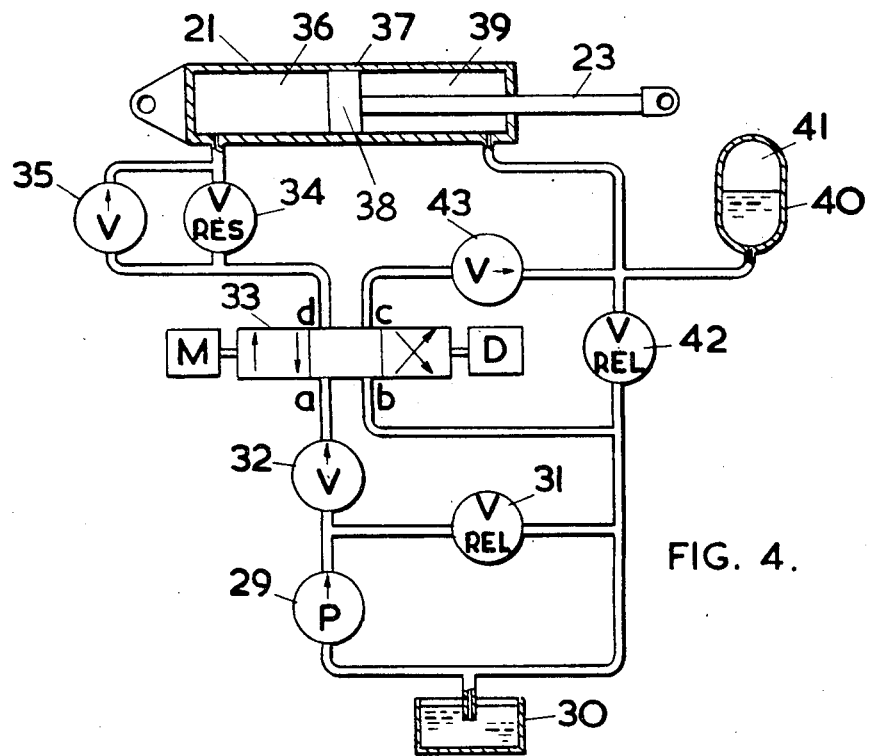
FIG. 4 is a diagrammatic representation of a hydraulic system suitable for application to the vehicle recovery tractor shown in FIG. 1.

A suitable hydraulic control system for operating the hydraulic ram 21 is shown diagrammatically in FIG. 4. A hydraulic pump 29 driven through a power take-off from the main propulsion engine 8, is connected by its suction side to a hydraulic fluid reservoir 30. A pressure relief valve 31, which may be preset to open at any desired pressure, is situated in a branch from the discharge line of the pump 29 leading to the hydraulic fluid reservoir 30. The discharge line of the pump 29 is connected in flow series with a non-return valve 32, one pair of connections through a flow switch 33 and a variable flow restrictor 34 in parallel with a non-return valve 35, to the extension side chamber 36 of the hydraulic ram cylinder 37. The retraction side chamber 39 of the hydraulic ram cylinder 37 contains the ram piston piston rod 23 which slides in fluid seals in the end wall of the cylinder 37. From the retraction side chamber 39 a hydraulic fluid line is connected to a three way branch. One branch leads to a hydraulic accumulator 40 wherein a compressible fluid, such as air, is trapped by the hydraulic fluid in a chamber 41 such that any increase in the hydraulic fluid pressure compresses the trapped fluid and the level of the hydraulic fluid rises in the accumulator 40. Another branch leads to an adjustable pressure relief valve 42 and thence to the fluid reservoir 30. The remaining branch is connected to the other pair of connections of the two way flow switch 33 through a non-return valve 43 opposing flow from the hydraulic accumulator 40 or the retraction side 39 of the hydraulic ram cylinder 37. From the two way flow switch the hydraulic line is connected to the fluid reservoir 30.

The two way flow switch 33 is of the cross over flow type enabling the four hydraulic connections *a*, *b*, *c*, and *d* to be in the flow series either *a*, to *d* and *b* to *c* or *a* to *c* and *b* to *d*. In FIG. 4 the parallel opposed arrows represent connection *a* to *d* and *b* to *c* whilst the crossed arrows represent connection *a* to *c* and *b* to *d*. The boxes M and D represent the switches such that when switch M is selected connections *a* to *d* and *b* to *c* are put into flow series and the corresponding cross over condition is selected by switch D. The switch over can be made either manually or by means of a solenoid.

When the two way flow switch 33 is set to ""D" the hydraulic accumulator 40 is charged by the hydraulic pump 29 and pressure is applied to the retraction side 39 of the hydraulic ram 21, the pressure build up being limited by the pressure relief valve 42. Relief valve 42 may be adjusted to vary the relief pressure and hence the force exerted by the hydraulic ram 21 to suit the weight of casualty being recovered.

Relief valve 42 also passes displaced fluid from the retraction side of the hydraulic ram 21 back to the fluid reservoir 30 when a rise in pressure beyond the setting of this relief valve occurs due to extension movement of the piston 38 of the hydraulic ram 21 which takes place as the center distance between this ram and the casualty rear axle is extended when the vehicle recovery tractor 1 commences to climb a gradient. Any ram piston movement which occurs in this way is restored automatically by flow back from the hydraulic accumulator 40 into the retraction side 39 of the hydraulic ram 21 as a reduction in center distance occurs between the hydraulic ram 21 and the rear axle of the casualty vehicle 19 due to a reduction in slope of the ground surface being negotiated.

By this means a substantially constant force is exerted automatically by the reactor device between the rear end 13 of the vehicle recovery tractor 1 and the rear axle of the casualty vehicle 19 independent of ground contours.

The non-return valve 43 is incorporated between the hydraulic pump 29 and the hydraulic accumulator 40 as a safety measure to ensure that the working pressure on the retraction side of the hydraulic ram 21 and hence the restraining force between the vehicle recovery tractor 1 and the rear axle of the casualty vehicle 19 is maintained should the driver stall the tractor engine on a steep gradient.

The hydraulic control system also incorporates a secondary circuit which provides a means of adjusting the setting of the reactor during coupling or uncoupling of the casualty vehicle 19.

This secondary circuit operates as follows:

When two way flow switch 33 is set to ""M" the flow from the hydraulic pump 29 is passed via the check valve 35 to the extension side 36 of the hydraulic ram 21. The pressure relief valve 31 is set to allow enough pressure build up to generate a sufficient force on the extension side 36 of the hydraulic ram 21 to discharge fluid from the retraction side 39 of this ram 21 through the pressure relief valve 31 and by this means achieve the extension movement of ram 21.

The flow restrictor valve 34 is incorporated to reduce the flow rate from the extension side of the hydraulic ram 21 back into the fluid reservoir 30 in order to reduce the speed of retraction movement of the ram piston 38 to a controllable rate.

In FIG. 3 another method of mounting a hydraulic ram 21a is shown, in which the body of the ram is attached to the rear end 13 of the vehicle recovery tractor 1 and the piston rod 23a extends toward the front of the vehicle recovery tractor 1. A pulley wheel 44 is mounted with its axis horizontal in a yoke 45 attached to the free end of the piston rod 23a. A wire rope assembly 25a is attached at one end to a rigid mounting 46 on the rear end 13 of the vehicle recovery tractor, from where it is led forwards over the pulley 44 and then rearwards through the rear end 13 between a pair of guide pulleys on horizontal axes 26. The guide pulleys and remainder of the associated equipment is similar to that formerly described for the construction shown in FIG. 2. The advantage of this latter construction is that the effect of the ram 21a movement is multiplied by a factor of two at the attachment point of wire rope assembly 25a. This multiplication of wire rope 25a movement to ram 21movement enables a shorter ram 21taking up less space, to be used, or, if a longer ram is used, reduces the chance of the ram piston bottoming at the end of the extension movement. If the piston bottoms, for instance, when the vehicles are passing over uneven terrain, the sudden load applied to the wire rope assembly 25may cause it to break. Therefore it is advantageous to have as long an effective movement as possible of the wire rope assembly 25a. *compression member 20c.*The compressive load produced in the compression member 20c.

Figure 5:
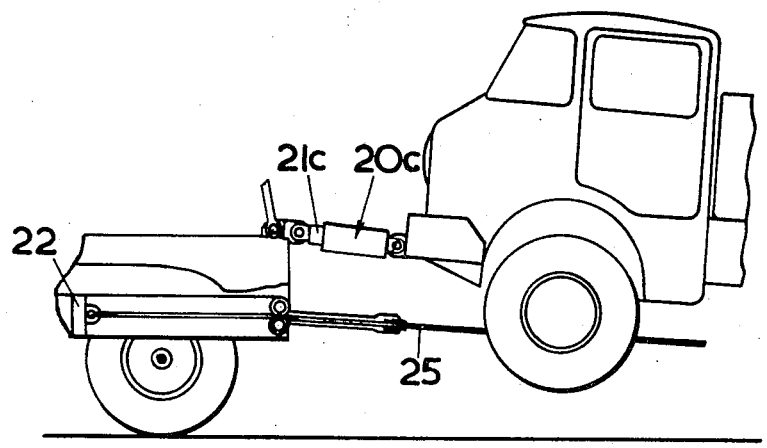
FIG. 5 is a detail view showing an alternative arrangement of a reactor device.
Figure 6:
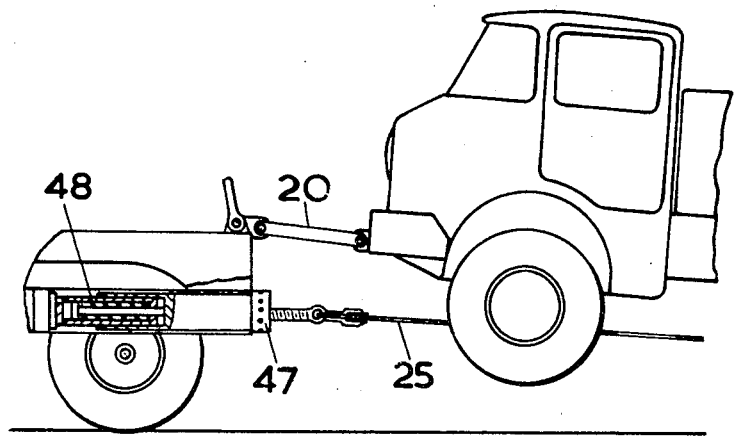
FIG. 6 is a sectional side view of another reactor device incorporating mechanical jacking means.

In an alternative construction shown in FIG. 5 the hydraulic ram 21c is arranged to form part of the compression member 20c and the wire rope assembly 25c is attached directly to the chassis frame cross member 22. The couple to offset the unloading of the front wheels 4 of the vehicle recovery tractor 1 is produced by coupling the two vehicles as previously described, then extending the integral hydraulic ram 21c of the compression member 20c. The compressive load produced in the compression members 20c. The compressive load produced in the compression member 20c induces a tension in the wire rope assembly 25c and the reactions of these forces on the vehicle recovery tractor tend to increase the contact forces between its front wheels and the ground.

Where the reactor is applied to lighter vehicles a hydraulic system may not be required and, as shown in FIG. 6, the hydraulic ram 21 can be replaced by a screw jack 47 attached, in series with a spring 48 of adjustable tension, to the vehicle recovery tractor. The adjustable tension spring 48 has the same effect as the fluid reservoir in providing a compliance whilst maintaining a reasonably constant tension in the wire rope assembly when undulations in the ground are negotiated with corresponding changes between the horizontal aspect of the towing vehicle and the towed vehicle.

Other applications of the invention are envisaged, for example; with mobile cranes where attachment of the tension and compression members could be made to a nearby heavy static object; towing combinations such as tractors and trailers or semi-trailers together with motor cars and caravans or aircraft tractors; also in the field of agriculture where large rear wheeled tractors are required to tow heavy trailers over uneven terrain.

I claim:

1. A reactor device for attachment to a wheeled towing vehicle having supporting means adapted to support an adjacent end of another vehicle, said reactor device comprising coupling means incorporating at least one compression device attached to the towing vehicle and adapted for attachment to the said adjacent end of the other vehicle, at least one tension device attached to the towing vehicle below the said compression device and adapted for attachment to the said other vehicle whereby a tensile force produced in the said tension device will induce in the said compression device a compressive force and likewise a compressive force produced in the said compression device will induce in the said tension device a tensile force constituting together with the compressive force a couple tending to increase the contact forces between the ground and those wheels of the towing vehicle which are remote from the other vehicle, and a hydro-pneumatic jacking means force and effective length controller having a constant force compliance means for maintaining a substantially constant couple in the said coupling means during small relative displacements of their respective attachment points.

2. A reactor device in accordance with claim 1 in which the said jacking means is incorporated into the said tension device for changing its effective length.

3. A reactor device in accordance with claim 1 in which the said jacking means is incorporated into the said compression device for changing its effective length.

4. A reactor device in accordance with claim 1 in which said jacking means incorporates a hydraulic ram.

5. A reactor device in accordance with claim 4. in which said ram incorporates a piston and said controller incorporates a manually selectable two-way hydraulic cross-over switch which in the one position connects a high pressure hydraulic fluid to one side and in the other position to the other side of the piston to produce a differential pressure across said piston urging it to move toward the lower pressure side.

6. A reactor device in accordance with claim 5 in which said compliance comprises a closed chamber part-filled with a compressible fluid and hydraulically in communication with that side of the piston which has the higher differential pressure applied to it when the couple is being applied between said towing vehicle and said other vehicle.

7. A reactor device in accordance with claim 1 in which said supporting means comprises a crane having a jib extending toward said other vehicle and a retractable suspension cable co-operating with said jib and adapted for attachment to said other vehicle.

8. A reactor device in accordance with claim 1 in which said tensile device comprises a wire rope assembly; and which has a guide frame attached to said towing vehicle, which guide frame supports a guide means through which said wire rope assembly extends toward said other vehicle; and said compression device is a bar having an attachment pivot for attachment to said other vehicle, said guide means and said attachment pivot being arranged to lie on a common axis perpendicular to the ground to provide a correct hinging action between said two vehicles when so attached.

* * * * *

UNITED STATES PATENT OFFICE
CERTIFICATE OF CORRECTION

Patent No. 3,687,315                    Dated    August 29, 1972

Inventor(s) John Taylor Donaldson

It is certified that error appears in the above-identified patent and that said Letters Patent are hereby corrected as shown below:

Cover page, item [73] "Denfense" should read --Defence--.
Column 2, line 65, "plateform" should read --platform--.
Column 4, line 32, delete the first quotation mark before "D". Column 5, line 6, delete the first quotation mark before "M"; line 45, "25may" should read --25a may--; lines 48-49, delete "compression member 20c. The compressive load produced in the compression member 20c."; lines 58-59, delete "The compressive load produced in the compression members 20c.".

Signed and sealed this 17th day of April 1973.

(SEAL)
Attest:

EDWARD M. FLETCHER, JR.                 ROBERT GOTTSCHALK
Attesting Officer                       Commissioner of Patents